US011781936B2

(12) United States Patent
Koyano et al.

(10) Patent No.: US 11,781,936 B2
(45) Date of Patent: Oct. 10, 2023

(54) AIRTIGHTNESS EVALUATION DEVICE

(71) Applicant: Mitsubishi Electric Corporation, Tokyo (JP)

(72) Inventors: Takehiro Koyano, Tokyo (JP); Naohiro Ichikawa, Tokyo (JP); Katsuya Taniguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 81 days.

(21) Appl. No.: 17/632,407

(22) PCT Filed: Oct. 4, 2019

(86) PCT No.: PCT/JP2019/039364
§ 371 (c)(1),
(2) Date: Feb. 2, 2022

(87) PCT Pub. No.: WO2021/065005
PCT Pub. Date: Apr. 8, 2021

(65) Prior Publication Data
US 2022/0291075 A1    Sep. 15, 2022

(51) Int. Cl.
*G01M 3/28* (2006.01)

(52) U.S. Cl.
CPC ................. *G01M 3/2815* (2013.01)

(58) Field of Classification Search
CPC ......... G01M 3/00; G01M 3/28; G01M 3/2815
See application file for complete search history.

(56) References Cited

FOREIGN PATENT DOCUMENTS

| CN | 106840549 A | * | 6/2017 | .......... G01M 3/2815 |
| CN | 108072499 A | * | 5/2018 | .............. G01M 3/28 |
| DE | 202011001002 U1 | | 8/2011 | |
| JP | H07-174661 A | | 7/1995 | |
| JP | H07-286932 A | | 10/1995 | |
| JP | H10-123005 A | | 5/1998 | |
| JP | 2873175 B2 | | 3/1999 | |
| JP | 2003-194439 A | | 7/2003 | |
| JP | 3771167 B2 | | 4/2006 | |
| JP | 2011-052863 A | | 3/2011 | |

(Continued)

OTHER PUBLICATIONS

First Examination Report dated Aug. 16, 2022 for the corresponding Indian Patent Application No. 202227018465 (and English translation).

(Continued)

*Primary Examiner* — Nguyen Q. Ha
(74) *Attorney, Agent, or Firm* — POSZ LAW GROUP, PLC (57) ABSTRACT

An airtightness evaluation device includes a differential pressure gauge to output a pressure difference between two spaces connected to two joints. A system joint for connecting a refrigeration cycle system is connected to one joint of the differential pressure gauge. A pressure vessel is connected to the other joint of the differential pressure gauge. The airtightness evaluation device includes a bypass circuit to connect the system joint and the pressure vessel to each other with bypassing the differential pressure gauge, and a bypass valve to open/close the bypass circuit. The airtightness evaluation device also includes a supply source joint for supplying a pressurization gas to the pressure vessel.

6 Claims, 7 Drawing Sheets

(56) References Cited

FOREIGN PATENT DOCUMENTS

| | | |
|---|---|---|
| JP | 2012-127710 A | 7/2012 |
| JP | 2016-176850 A | 10/2016 |
| JP | 2017-116387 A | 6/2017 |
| JP | 7034381 B2 * | 3/2022 .............. F25B 49/02 |

OTHER PUBLICATIONS

Office Action dated Oct. 18, 2022 for the corresponding Japanese Application No. 2021-550932 (and English machine translation).
International Search Report of the International Searching Authority dated Dec. 3, 2019, issued in corresponding International Application No. PCT/JP2019/039364 (and English Machine Translation).
Extended European Search Report (EESR) dated Sep. 19, 2022 for the corresponding European Application No. 19948162.3.

* cited by examiner

AIRTIGHTNESS EVALUATION DEVICE

CROSS REFERENCE TO RELATED APPLICATION

This application is a U.S. National Stage Application of International Application No. PCT/JP2019/039364, filed on Oct. 4, 2019, the contents of which are incorporated herein by reference.

TECHNICAL FIELD

The present invention relates to a technique of evaluating airtightness in a refrigeration cycle system.

BACKGROUND

A refrigeration cycle system such as an air-conditioning device and a refrigeration device, which utilizes a refrigeration cycle is widely used all over the world and is indispensable for life of modern people. However, since a refrigerant sealed in the refrigeration cycle has a greenhouse effect and is flammable, its adverse effect caused by a leak poses an issue.

In Japan, "Act on Rational Use and Appropriate Management of CFCs" was enforced in April 2015, making it mandatory to inspect and record a refrigerant leak and to report a case of leak.

When sealing a refrigerant in a refrigeration cycle system in installation and repair, it is necessary to make sure before sealing that there is no leak in the refrigeration cycle.

Nitrogen pressure leak test is widely used as a method of determining whether a leak exists or not. In the nitrogen pressure leak test, nitrogen is sealed and pressurized in a refrigeration cycle before sealing a refrigerant. Airtightness of the refrigeration cycle is evaluated based on a pressure change observed until a lapse of a certain period of time. If the airtightness is higher than a reference, it is determined that there is no leak.

In Patent Literature 1, a pipe inserter for connecting a nitrogen cylinder is used to improve work efficiency of the nitrogen pressure leak test.

PATENT LITERATURE

Patent Literature 1: JPH 07-286932 A

In a nitrogen pressure leak test, in order to measure a pressure of pressurized nitrogen, it is necessary to use a pressure gauge that can measure a high pressure. The pressure gauge capable of measuring a high pressure has a low resolution and accordingly cannot readily measure a small change in pressure. In the nitrogen pressure leak test, when an amount of leakage is very small, it takes time before the pressure drops sufficiently so that the drop can be definitely measured by the pressure gauge. Therefore, in the nitrogen pressure leak test, it takes a long time such as one day to evaluate airtightness after nitrogen is sealed and pressurized.

In Patent Literature 1, although a time taken until start of the pressurized leak test can be reduced, it is impossible to shorten a time costed by the nitrogen pressurized leak test itself which accounts for most of the total of a series of working hours.

SUMMARY

An objective of the present invention is to enable evaluation of airtightness in a refrigeration cycle system with using a simple and easy method.

An airtightness evaluation device for a refrigeration cycle system according to the present invention includes:

a differential pressure gauge to output a pressure difference between two spaces connected to two joints;

a system joint for connecting the refrigeration cycle system to one joint of the differential pressure gauge;

a pressure vessel connected to the other joint of the differential pressure gauge;

a bypass circuit to connect the system joint and the pressure vessel to each other with bypassing the differential pressure gauge;

a bypass valve to open/close the bypass circuit; and a supply source joint for supplying a pressurization gas to the pressure vessel.

In the present invention, airtightness of a refrigeration cycle system can be evaluated on the basis of a differential pressure between a pressure vessel and a refrigeration cycle system. To measure the differential pressure, a pressure gauge capable of measuring a high pressure is not necessary, and a differential pressure gauge that can measure a small differential pressure can be used. Therefore, it is possible to evaluate the airtightness without requiring long-time waiting.

DETAILED DESCRIPTION

Embodiment 1

*Description of Configurations*

Figure 1:
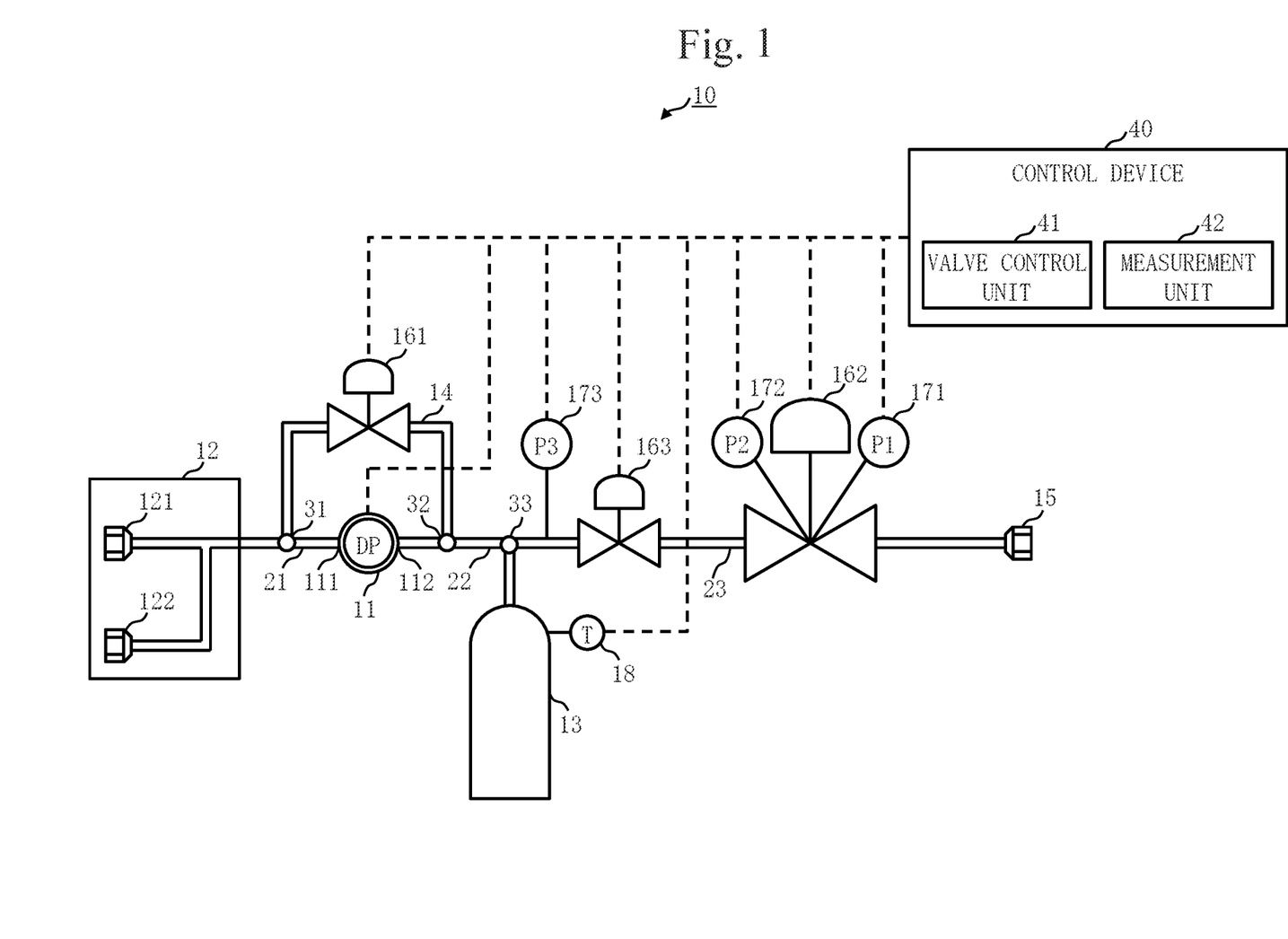
FIG. 1 is a configuration diagram of an airtightness evaluation device 10 for a refrigeration cycle system 50 according to Embodiment 1.

A configuration of an airtightness evaluation device 10 for a refrigeration cycle system 50 according to Embodiment 1 will be described with referring to FIG. 1.

The airtightness evaluation device 10 is provided with a differential pressure gauge 11, a system joint 12, a pressure vessel 13, a bypass circuit 14, a supply source joint 15, a bypass valve 161, a pressure adjusting valve 162, a gas supply valve 163, a source-pressure gauge 171, an adjusted-pressure gauge 172, an applied-pressure gauge 173, a thermometer 18, pipes 21, 22, and 23, and a control device 40.

The differential pressure gauge 11 outputs a pressure difference between two spaces connected to two joints. The system joint 12 for connecting the refrigeration cycle system 50 is connected to one joint 111 of the differential pressure gauge 11 via the pipe 21. The system joint 12 has two joints;

a joint 121 and a joint 122 which are to be connected to different positions of the refrigeration cycle system 50. The pressure vessel 13 is connected to the other joint 112 of the differential pressure gauge 11 via the pipe 22.

The bypass circuit 14 connects the system joint 12 and the pressure vessel 13 to each other with bypassing the differential pressure gauge 11. Specifically, the bypass circuit 14 connects a connection point 31 of the pipe 21 and a connection point 32 of the pipe 22 to each other, the pipe 21 connecting the differential pressure gauge 11 and the system joint 12 to each other, the pipe 22 connecting the differential pressure gauge 11 and the pressure vessel 13 to each other.

The bypass circuit 14 has the bypass valve 161 which opens/closes the bypass circuit 14.

The supply source joint 15 for supplying a pressurization gas to the pressure vessel 13 is connected, via the pipe 23, to a connection point 33 of the pipe 22 that connects the differential pressure gauge 11 and the pressure vessel 13 to each other. A gas cylinder or the like in which the pressurization gas is sealed is connected to the supply source joint 15.

The pipe 23 has the pressure adjusting valve 162 for adjusting a pressure of the gas to be supplied to the pressure vessel 13, and the gas supply valve 163 for switching supply on/off of the gas to the pressure vessel 13.

The source-pressure gauge 171 is designed to measure a pressure in the pipe 23 between the supply source joint 15 and the pressure adjusting valve 162. That is, the source-pressure gauge 171 measures the pressure of the gas supplied from the supply source joint 15. The adjusted-pressure gauge 172 is designed to measure the pressure in the pipe 23 between the pressure adjusting valve 162 and the gas supply valve 163. That is, the adjusted-pressure gauge 172 measures the pressure of the gas having passed through the pressure adjusting valve 162. The applied-pressure gauge 173 is designed to measure the pressure in the pipe 23 between the gas supply valve 163 and the connection point 33. That is, the applied-pressure gauge 173 measures the pressure applied to the pressure vessel 13 and the refrigeration cycle system 50.

A configuration formed of the pressure adjusting valve 162, the source-pressure gauge 171, and the adjusted-pressure gauge 172 is the same as a configuration generally referred to as a pressure adjusting unit (regulator).

The differential pressure gauge 11 is different from the source-pressure gauge 171, the adjusted-pressure gauge 172, and the applied-pressure gauge 173 in terms of a range of a pressure to measure.

Each of the source-pressure gauge 171, the adjusted-pressure gauge 172, and the applied-pressure gauge 173 is required to be able to measure a pressure to be applied to the refrigeration cycle system 50 when evaluating the airtightness. In evaluation of the airtightness of the refrigeration cycle system 50, a pressure zone of 2 to 10 MPa (megapascal) is used.

As opposed to this, the differential pressure gauge 11 is not required to be able to measure the pressure to be applied to the refrigeration cycle system 50 when evaluating the airtightness, since the differential pressure gauge 11 measures a pressure difference between the refrigeration cycle system 50 and the pressure vessel 13. The differential pressure gauge 11 may be able to measure a pressure that is $1/5$ or less and $1/50$ or more of the pressure to be applied to the refrigeration cycle system 50 when evaluating the airtightness. In other words, a maximum value of the pressure that can be measured by the differential pressure gauge 11 may be $1/5$ or less and $1/50$ or more of a pressure that can be measured by the source-pressure gauge 171, the adjusted-pressure gauge 172, and the applied-pressure gauge 173. For example, when the maximum value of the pressure that can be measured by the source-pressure gauge 171, the adjusted-pressure gauge 172, and the applied-pressure gauge 173 is 5 MPa, the maximum value of the pressure that can be measured by the differential pressure gauge 11 may be 250 kPa (kilopascal).

The pipes 21, 22, and 23 are made of copper or aluminum that can withstand the pressure applied to the refrigeration cycle system 50 when evaluating the airtightness. The pipes 21, 22, and 23 may be constituted of a hose or the like that can withstand the pressure applied to the refrigeration cycle system 50 when evaluating the airtightness.

The control device 40 is a computer such as a microcomputer. The control device 40 is provided with a valve control unit 41 and a measurement unit 42 as function constituent elements. Functions of the valve control unit 41 and measurement unit 42 are implemented by software. Alternatively, the functions of the valve control unit 41 and measurement unit 42 may be implemented by hardware such as a Field Programmable Gate Array (FPGA).

Figure 2:
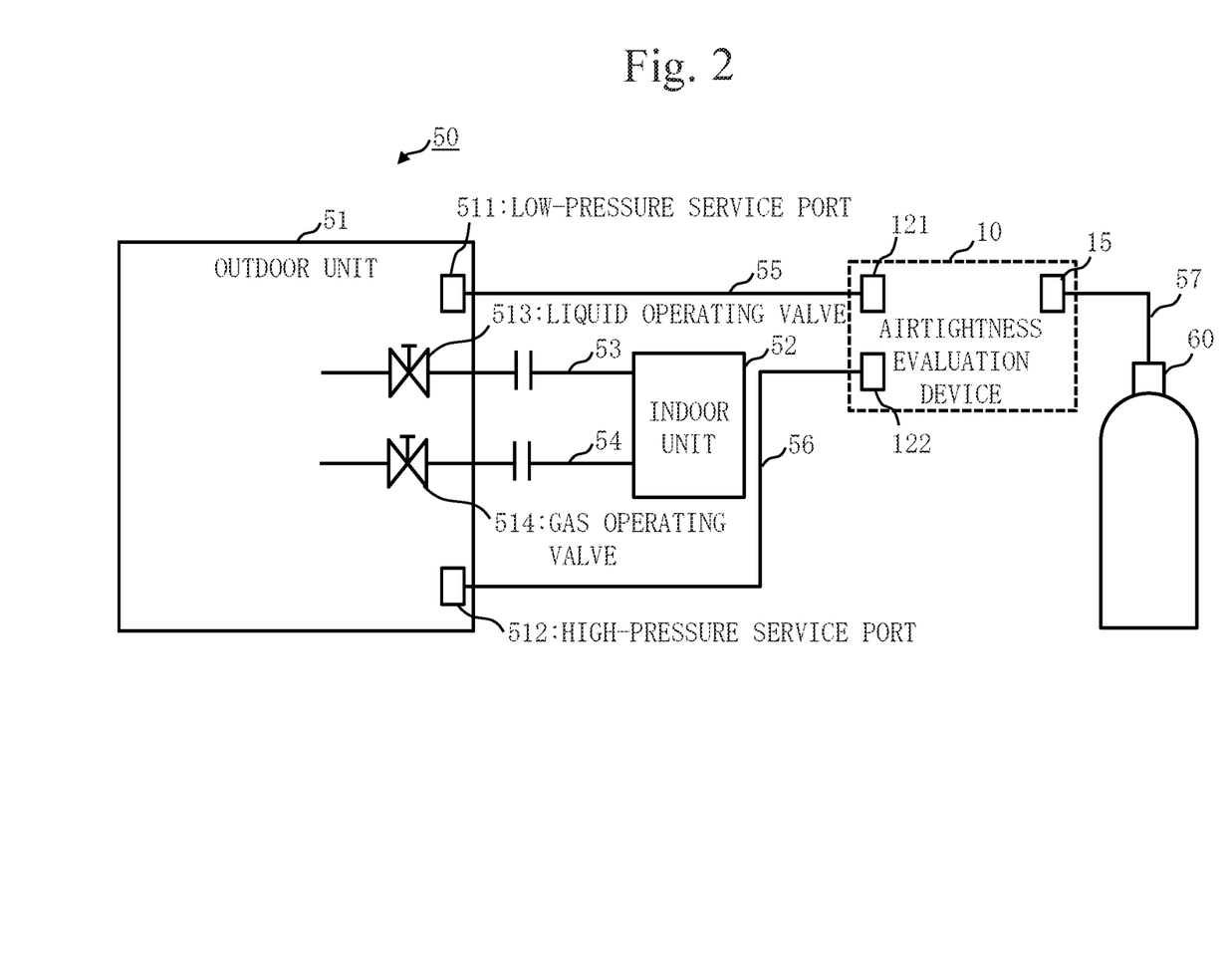
FIG. 2 is a diagram explaining how to connect the airtightness evaluation device 10 to the refrigeration cycle system 50 according to Embodiment 1.

How to connect the airtightness evaluation device 10 to the refrigeration cycle system 50 according to Embodiment 1 will be described with referring to FIG. 2.

In Embodiment 1, the refrigeration cycle system 50 is an air-conditioning system provided with an outdoor unit 51 and an indoor unit 52 that constitute a vapor compression type refrigeration cycle. The outdoor unit 51 and the indoor unit 52 are connected to each other via a liquid pipe 53 through which a liquid refrigerant flows, and via a gas pipe 54 through which a gas refrigerant flows.

The outdoor unit 51 is provided with a compressor, a heat exchanger, and so on which are connected in series via a refrigerant pipe. The outdoor unit 51 has a low-pressure service port 511 in a low-pressure pipe which is on a suction side of the compressor, and a high-pressure service port 512 in a high-pressure pipe which is on a discharge side of the compressor. The low-pressure service port 511 and the high-pressure service port 512 are utilized for connecting a pressure gauge to measure an internal pressure, and for connecting a gas cylinder to inject a gas into the outdoor unit 51.

Also, the outdoor unit 51 has a liquid operating valve 513 near a connecting portion with the liquid pipe 53, and a gas operating valve 514 near a connecting portion with the gas pipe 54.

Of the airtightness evaluation device 10, the joint 121 and the joint 122 are connected to the low-pressure service port 511 and the high-pressure service port 512, respectively, via connecting parts 55 and 56 such as hoses and pipes. By doing so, the airtightness evaluation device 10 is connected to the refrigeration cycle system 50.

The supply source joint 15 of the airtightness evaluation device 10 is connected to a nitrogen cylinder 60 via a connecting part 57 such as a hose and a pipe. Nitrogen is sealed in the nitrogen cylinder 60.

*Description of Operations*

Operations of the airtightness evaluation device 10 according to Embodiment 1 will be described with referring to FIG. 3.

An operation procedure of the airtightness evaluation device 10 according to Embodiment 1 corresponds to an airtightness evaluation method according to Embodiment 1.

Note that the liquid operating valve 513 and gas operating valve 514 in the outdoor unit 51 have been opened by an operator or the like. Also, note that the bypass valve 161, the pressure adjusting valve 162, and the gas supply valve 163 are in a closed state before the following operations are started.

In step S11, the valve control unit 41 of the control device 40 opens the bypass valve 161 and the gas supply valve 163. By doing so, the pressure vessel 13 of the airtightness evaluation device 10 communicates with the outdoor unit 51 and indoor unit 52 of the refrigeration cycle system 50.

In step S12, the measurement unit 42 measures the pressure with the adjusted-pressure gauge 172. Then, the valve control unit 41 adjusts an opening of the pressure adjusting valve 162 such that the pressure measured by the adjusted-pressure gauge 172 is slightly higher than a target pressure. For example, if the target pressure is 2 MPa, the valve control unit 41 adjusts the opening of the pressure adjusting valve 162 such that the pressure measured by the adjusted-pressure gauge 172 is 2.2 MPa.

In step S13, at a lapse of a predetermined period of time, when nitrogen gas is supplied from the nitrogen cylinder 60 to the pressure vessel 13, the outdoor unit 51, and the indoor unit 52, the valve control unit 41 closes the gas supply valve 163.

In step S14, the measurement unit 42 measures the pressure with the applied-pressure gauge 173. If the pressure measured by the applied-pressure gauge 173 is lower than the target pressure, the measurement unit 42 advances processing to step S15. On the other hand, if the pressure measured by the applied-pressure gauge 173 is equal to or higher than the target pressure, the measurement unit 42 advances the processing to step S16.

In step S15, the valve control unit 41 opens the gas supply valve 163 to supply the nitrogen gas from the nitrogen cylinder 60 to the pressure vessel 13, the outdoor unit 51, and the indoor unit 52 again. Then, at a lapse of a predetermined period of time, the valve control unit 41 brings the processing back to step S13 to close the gas supply valve 163. With the processing of step S13 to step S15, the pressures in the pressure vessel 13, outdoor unit 51, and indoor unit 52 can be set to be equal to or higher than the target pressure.

In step S16, the control device 40 waits until a wait time of 10 minutes or so elapses, to equalize the pressures in the pressure vessel 13, outdoor unit 51, and indoor unit 52.

In step S17, the valve control unit 41 closes the bypass valve 161. By doing so, the pressure vessel 13 of the airtightness evaluation device 10 is disconnected from the refrigeration cycle system 50. Accordingly, if a nitrogen gas leak exists on the refrigeration cycle system 50 side, a differential pressure is measured by the differential pressure gauge 11.

In step S18, the measurement unit 42 measures the differential pressure between the pressure vessel 13 and the refrigeration cycle system 50 with the differential pressure gauge 11. As for the differential pressure to be measured, the pressure of the pressure vessel 13 serves as a reference. That is, if a nitrogen gas leak exists on the refrigeration cycle system 50 side, the differential pressure takes a positive value. If a nitrogen gas leak exists on the pressure vessel 13 side, the differential pressure takes a negative value.

The measurement unit 42 determines whether or not the measured differential pressure is higher than 0 MPa. If the measured differential pressure is higher than 0 MPa, the measurement unit 42 advances the processing to step S19. On the other hand, if the measured differential pressure is equal to or lower than 0 MPa, the measurement unit 42 advances the processing to step S20.

In step S19, the measurement unit 42 determines that a nitrogen gas leak exists on the refrigeration cycle system 50 side. On the other hand, in step S20, the measurement unit 42 determines that a nitrogen gas leak does not exist on the refrigeration cycle system 50 side.

In the above description, in step S18, 0 MPa is used as a reference value, and whether a leak exists or not is determined in accordance with whether the differential pressure is larger than the reference value or not. However, the measurement unit 42 may correct the reference value in accordance with a temperature in the pressure vessel 13 measured by the thermometer 18.

How the reference value is corrected will be described.

For example, with a gas like nitrogen that exhibits behavior close to that of an ideal gas, the temperature and the pressure follow a Boyle-Charles' law. The Boyle-Charles' law is given by expression (1) using a pressure P, a volume V, a temperature T, and a constant k.

$$P = k \cdot T/V \quad \text{Expression (1)}$$

Assume that a pressure in an equal-pressure state realized in step S16 is expressed as P0 and that a temperature measured by the thermometer 18 in the equal-pressure state is expressed as T0. Here, assume that during a transition from step S16 to step S18, the pressure vessel 13 is influenced by a surrounding temperature change and accordingly the temperature measured by the thermometer 18 changes to T1. The pressure vessel 13 has a smaller internal volume and a smaller heat capacity when compared to the refrigeration cycle system 50 with which the pressure is to be compared, and accordingly the pressure vessel 13 tends to be influenced by the temperature change.

Now, about a pressure P1 in the pressure vessel 13, expression (2) holds.

$$P1 = P0 \cdot T1/T0 \quad \text{Expression (2)}$$

Therefore, even if there is no nitrogen gas leak, a differential pressure $\Delta Tc$ measured by the differential pressure gauge 11 satisfies expression (3).

$$\Delta Tc = P0 - P1 = P0 \cdot (T0 - T1)/T0 \quad \text{Expression (3)}$$

In view of this, the measurement unit 42 decides $\Delta Tc$, not 0 MPa, as the reference value to be used in step S18. This enables high-accuracy airtightness evaluation regardless of a temperature change that occurs the operations of the airtightness evaluation device 10.

*Effect of Embodiment 1*

As described above, the airtightness evaluation device 10 according to Embodiment 1 evaluates airtightness of the refrigeration cycle system 50 on the basis of the differential pressure with respect to the pressure vessel 13. To measure the differential pressure, a pressure gauge capable of measuring a high pressure is not necessary, and a differential pressure gauge that can measure a small differential pressure can be used. Therefore, it is possible to evaluate the airtightness without requiring long-time waiting.

Also, the airtightness evaluation device 10 according to Embodiment 1 corrects the reference value used for airtightness evaluation in accordance with the internal temperature of the pressure vessel 13. Hence, high-accuracy airtightness evaluation is possible regardless of a temperature change that occurs during the operations of the airtightness evaluation device 10.

Also, in the airtightness evaluation device 10 according to Embodiment 1, instruments such as the differential pressure gauge 11 and the pressure vessel 13 are integrated. Therefore, the airtightness of the airtightness evaluation device 10 can be improved by, for example, welding connecting portions of the instruments. Hence, high-accuracy airtightness evaluation is possible.

On a site where airtightness evaluation is performed with using instruments such as the differential pressure gauge 11 and the pressure vessel 13 as different configurations that are not integrated, flare-processed pipes may be connected. In this case, however, the airtightness in the constituent elements of the airtightness evaluation device 10 decreases, and the accuracy of the airtightness evaluation decreases. Also, a number of work man-hours at the site increases.

There is a case where the refrigeration cycle system 50 has a solenoid valve or a check valve. Then, if a pressure is applied only from either one or the other of the low-pressure side and the high-pressure side, it may be difficult to equalize the pressure. Even in a case where a solenoid valve or a check valve is not provided, when an opening of an expansion valve is small at the time the refrigeration cycle system 50 stops operating, if a pressure is applied only from either one or the other of the low-pressure side and the high-pressure side, it takes time before the pressure is equalized.

The joint 121 and the joint 122 in the airtightness evaluation device 10 according to Embodiment 1 are connected to the low-pressure service port 511 and the high-pressure service port 512, respectively. This makes it possible to equalize the pressure in the refrigeration cycle system 50 even if a solenoid valve or a check valve is provided. Also, even if the opening of the expansion valve is small at the time the refrigeration cycle system 50 stops operating, it is possible to equalize the pressure in the refrigeration cycle system 50 within a short period of time.

*Other Configurations*

<Modification 1>

In Embodiment 1, airtightness evaluation is performed in a state where the liquid operating valve 513 and the gas operating valve 514 are open. As the liquid operating valve 513 and the gas operating valve 514 are open, the outdoor unit 51 and the indoor unit 52 communicate with each other. Therefore, whether nitrogen gas leaks or not from at least either one or the other of the outdoor unit 51 and the indoor unit 52 is determined.

Figure 3:
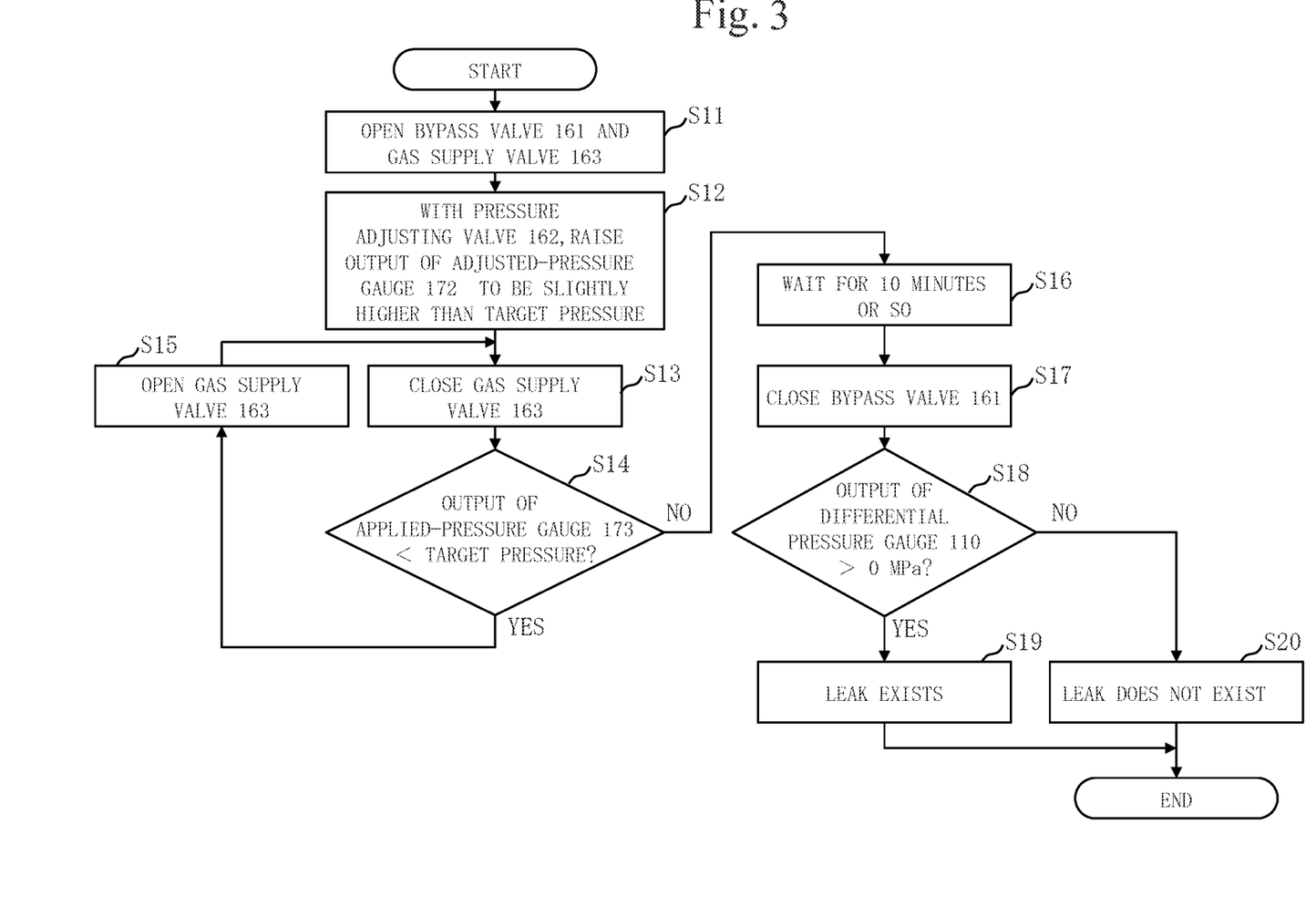
FIG. 3 is a flowchart illustrating operations of the airtightness evaluation device 10 according to Embodiment 1.

If it is determined that a leak exists, the liquid operating valve 513 and the gas operating valve 514 may be closed, and after that the processing illustrated in FIG. 3 may be executed. By closing the liquid operating valve 513 and the gas operating valve 514, the outdoor unit 51 and the indoor unit 52 are disconnected from each other. Thus, the liquid operating valve 513 and the gas operating valve 514 are closed, and after that the processing illustrated in FIG. 3 is executed, so that whether nitrogen gas leaks or not from the outdoor unit 51 can be determined.

<Modification 2>

In Embodiment 1, the airtightness evaluation device 10 is connected to the low-pressure service port 511 and high-pressure service port 512 of the refrigeration cycle system 50.

Figure 4:
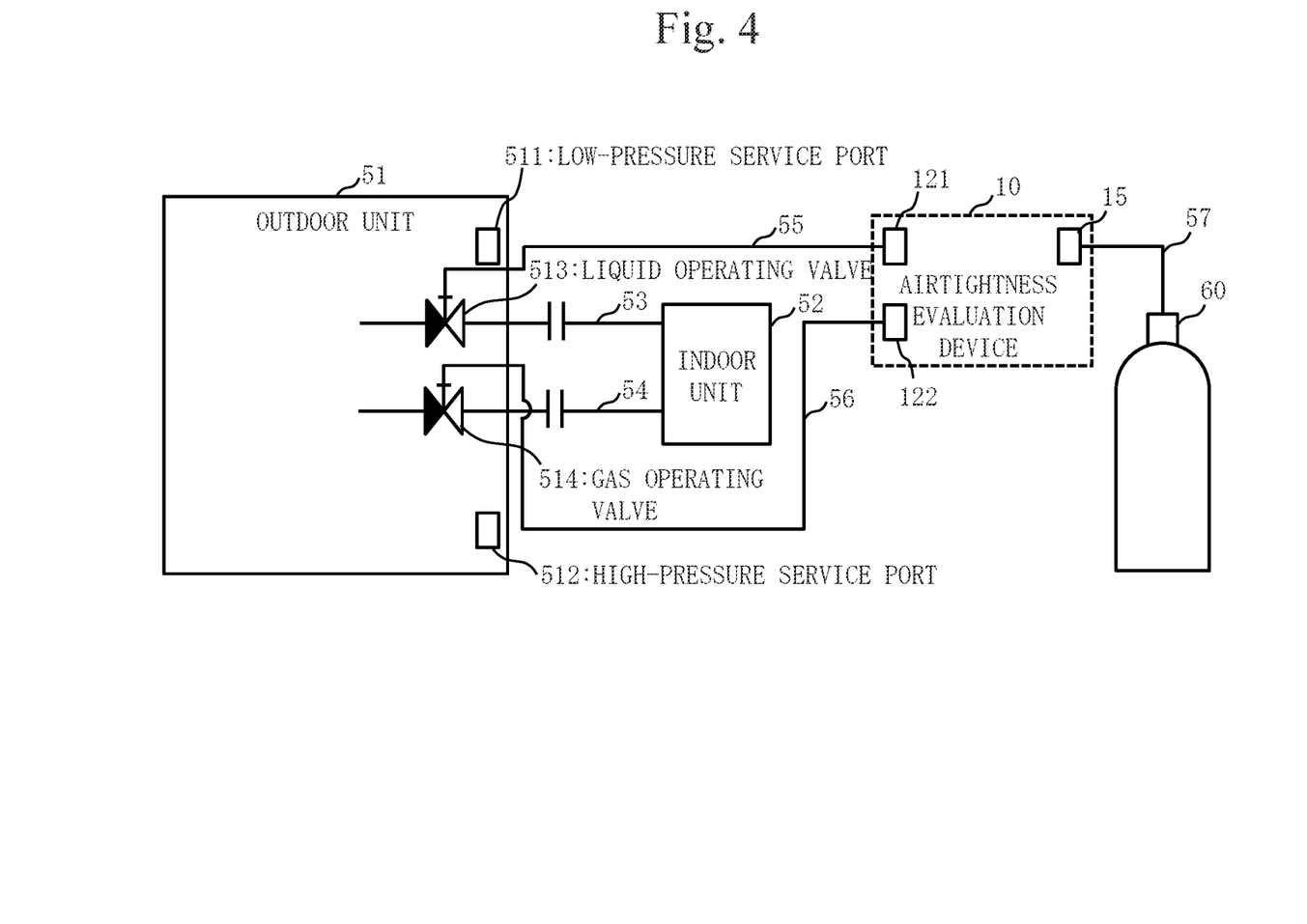
FIG. 4 is a diagram explaining how to connect an airtightness evaluation device 10 to a refrigeration cycle system 50 according to Modification 2.

If it is determined that a leak exists, the airtightness evaluation device 10 may be connected to the liquid operating valve 513 and gas operating valve 514 of the refrigeration cycle system 50, then the liquid operating valve 513 and the gas operating valve 514 may be closed, as illustrated in FIG. 4, and after that the processing illustrated in FIG. 3 may be performed. The liquid operating valve 513 and the gas operating valve 514 have ports for measuring the pressure. When the liquid operating valve 513 and the gas operating valve 514 are closed, the ports communicate with the indoor unit 52 side. Thus, the airtightness evaluation device 10 is connected to the liquid operating valve 513 and the gas operating valve 514 and then the liquid operating valve 513 and the gas operating valve 514 are closed, and after that the processing illustrated in FIG. 3 is executed, so that whether nitrogen gas leaks or not from the indoor unit 52 can be determined.

In a case where a service port for measuring the pressure and a valve for dividing the refrigeration cycle are formed at various positions of the refrigeration cycle system 50, the connecting positions of the airtightness evaluation device 10 and the dividing positions of the refrigeration cycle are changed, and after that the processing illustrated in FIG. 3 is executed, so that a location where the leak exists can be limited.

<Modification 3>

In Embodiment 1, the refrigeration cycle system 50 is an air-conditioning system. However, the refrigeration cycle system 50 is not limited to an air-conditioning system, but can be a refrigeration system such as a refrigerator.

<Modification 4>

Figure 5:
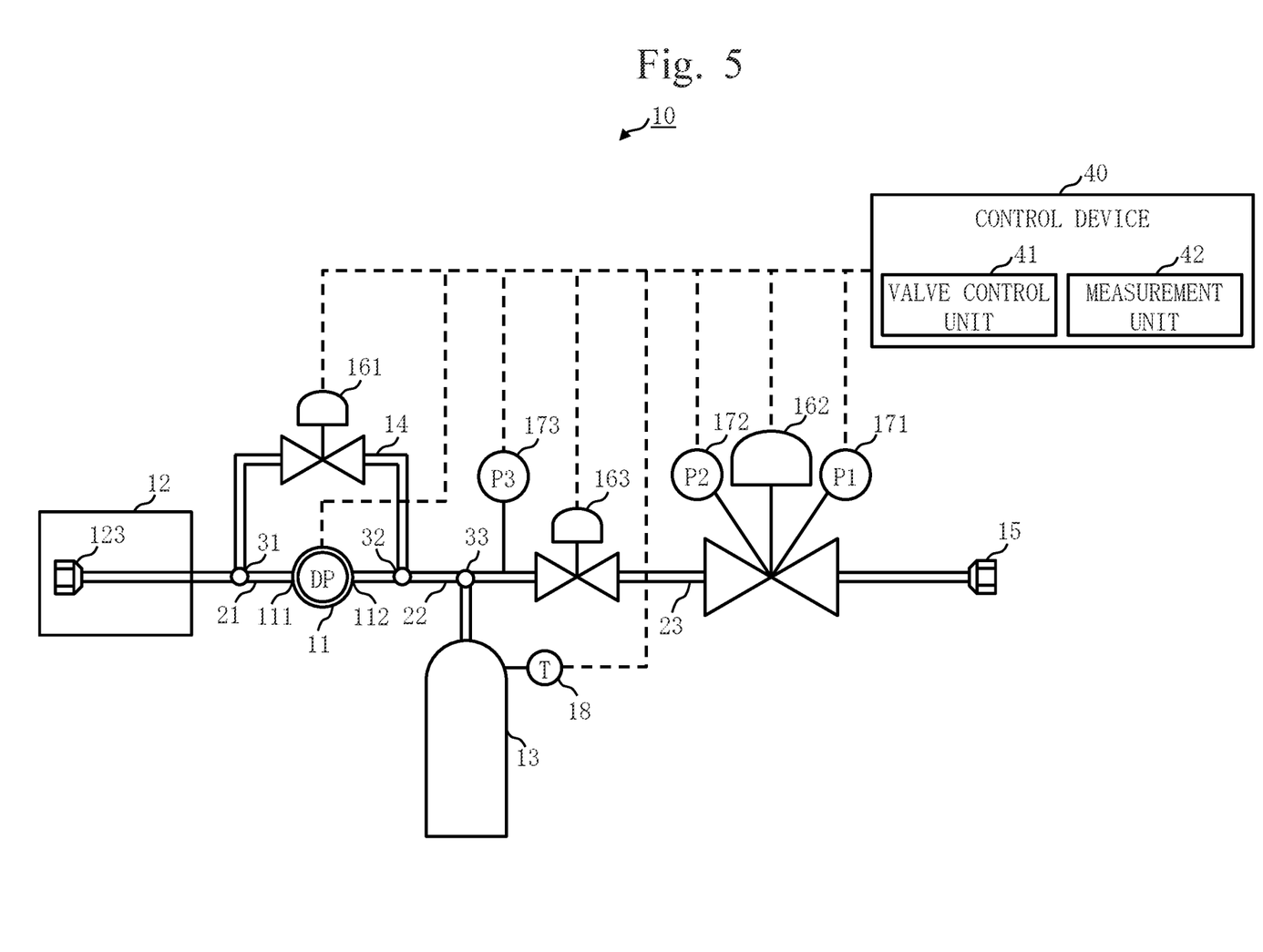
FIG. 5 is a configuration diagram of an airtightness evaluation device 10 for a refrigeration cycle system 50 according to Modification 4.
Figure 6:
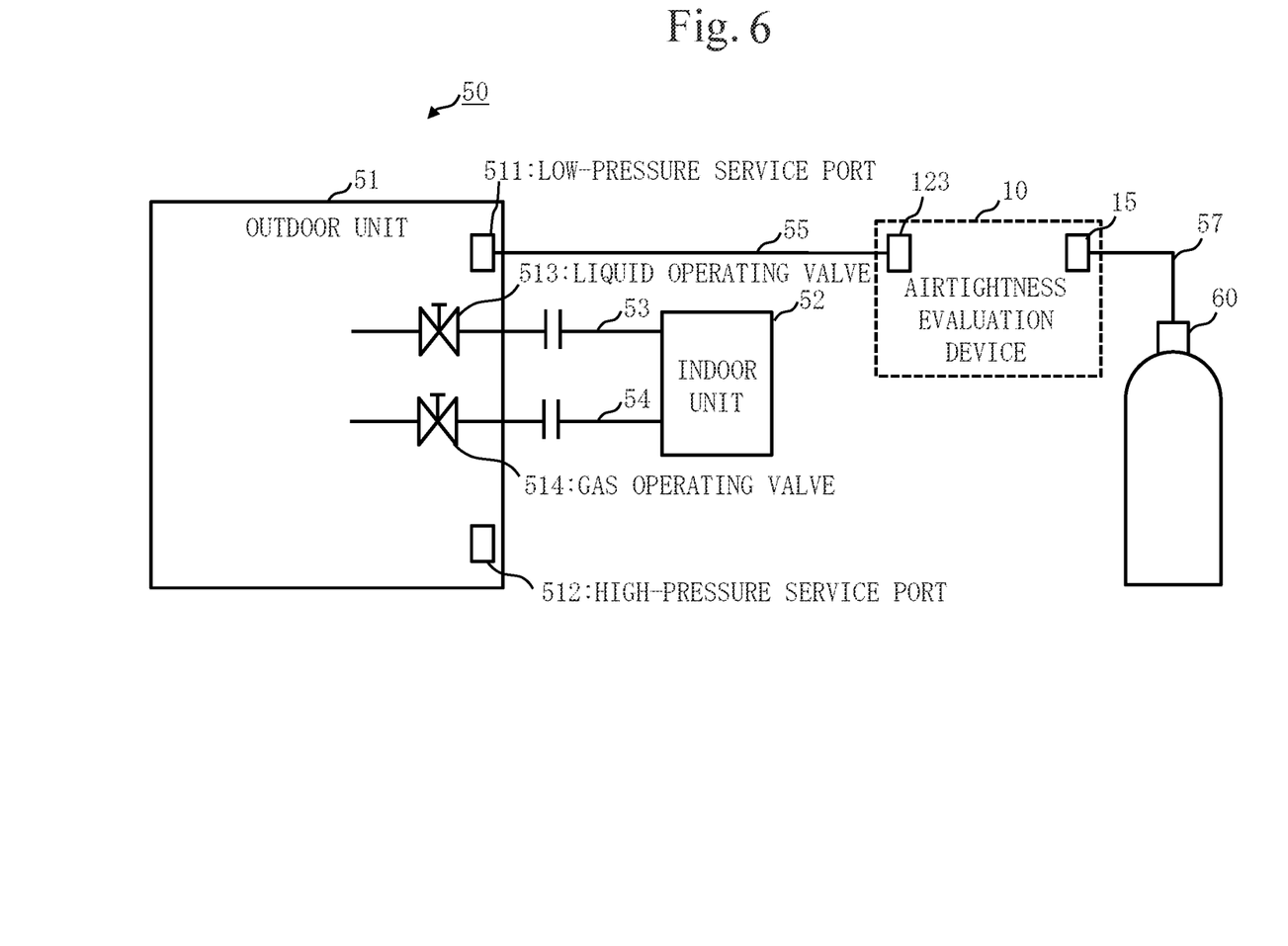
FIG. 6 is a diagram explaining how to connect the airtightness evaluation device 10 to the refrigeration cycle system 50 according to Modification 4.

In Embodiment 1, the system joint 12 has the two joints: the joint 121 and the joint 122 which are to be connected to different positions. However, if a solenoid valve or a check valve is not installed in the refrigeration cycle system 50, the system joint 12 may have only one joint 123, as illustrated in FIG. 5. In this case, the joint 123 is connected to the low-pressure service port 511 of the refrigeration cycle system 50, as illustrated in FIG. 6. Alternatively, the joint 123 may be connected to the high-pressure service port 512 of the refrigeration cycle system 50.

With this configuration, it may take time before the pressure in the refrigeration cycle system 50 is equalized.

Embodiment 2

Figure 7:
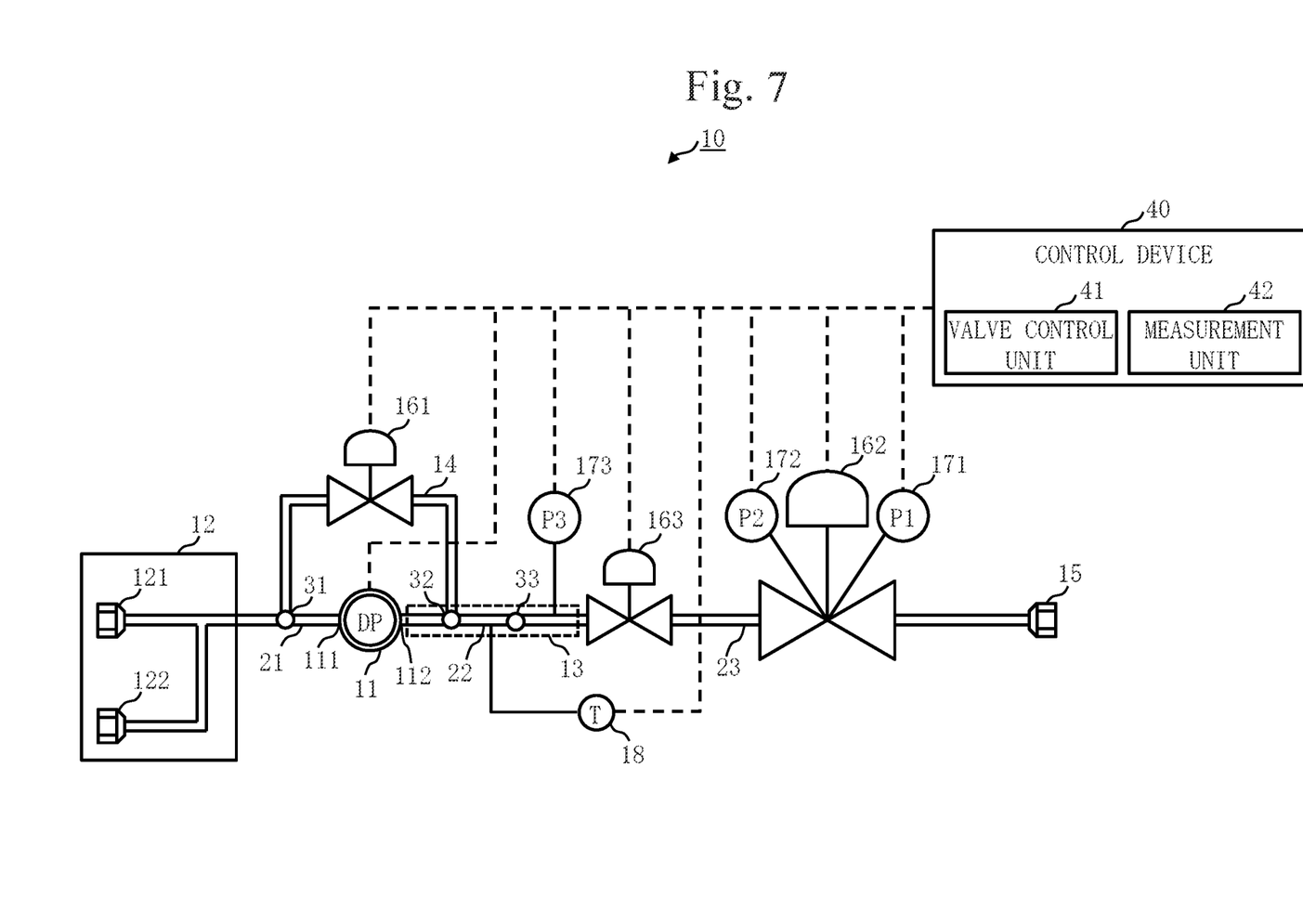
FIG. 7 is a configuration diagram of an airtightness evaluation device 10 for a refrigeration cycle system 50 according to Embodiment 2.

A pressure vessel 13 is implemented by a pipe 22. In this respect, Embodiment 2 is different from Embodiment 1. In Embodiment 2, this difference will be described, and the same features will not be described.

In Embodiment 1, the pressure vessel 13 is connected to the differential pressure gauge 11 via the pipe 22. However, in Embodiment 2, a closed space defined by a pipe 22 is utilized as a pressure vessel 13, as illustrated in FIG. 7. More precisely, a region in the pipe 22 between a differential pressure gauge 11 and a gas supply valve 163 is utilized as the pressure vessel 13.

Since the pressure vessel 13 is implemented by the pipe 22 as described above, an airtightness evaluation device 10 can be made compact. Thus, the operation workability at a site where airtightness evaluation is performed can be improved.

Since the pressure vessel 13 becomes compact, it tends to be influenced by a surrounding temperature change. However, by correcting a reference value in accordance with a temperature measured by a thermometer 18, high-accuracy airtightness evaluation can be performed.

Embodiments and modifications of the present invention have been described above. Some of the embodiments and modifications may be practiced by combination. Also, one or some of the embodiments and modifications may be practiced partly. Note that the present invention is not limited to the above embodiments and modifications, but various changes can be made to the present invention as needed.

The invention claimed is:

1. An airtightness evaluation device for a refrigeration cycle system, the airtightness evaluation device comprising:

a differential pressure gauge to output a pressure difference between two spaces connected to two joints;

a system joint for connecting the refrigeration cycle system to one joint of the differential pressure gauge and having two joints to be connected to different positions of the refrigeration cycle system;

a pressure vessel connected to the other joint of the differential pressure gauge;

a bypass circuit to connect the system joint and the pressure vessel to each other with bypassing the differential pressure gauge;

a bypass valve to open/close the bypass circuit; and a supply source joint for supplying a pressurization gas to the pressure vessel.

2. The airtightness evaluation device for the refrigeration cycle system according to claim 1, wherein the two joints are connected, one to a high-pressure side and the other to a low-pressure side, of the refrigeration cycle system.

3. The airtightness evaluation device for the refrigeration cycle system, according to claim 1, wherein pressure vessel is a pipe connected to the other joint of the differential pressure gauge.

4. The airtightness evaluation device for the refrigeration cycle system according to claim 1, the airtightness evaluation device for the refrigeration cycle system further comprising a pressure adjusting valve for adjusting a pressure of the gas to be supplied to the pressure vessel, and a gas supply valve for switching supply on/off of the gas to the pressure vessel, the pressure adjusting valve and the gas supply valve being provided between the supply source joint and the pressure vessel.

5. The airtightness evaluation device for the refrigeration cycle system according to claim 1, the airtightness evaluation device for the refrigeration cycle system further comprising a thermometer to measure a temperature of the gas accumulated in the pressure vessel.

6. The airtightness evaluation device for the refrigeration cycle system according to claim 1, wherein the differential pressure gauge has a measurement range with a maximum value that is $\frac{1}{5}$ or less of a pressure of the gas to be supplied to the pressure vessel.

\* \* \* \* \*